(12) United States Patent
Shimbo et al.

(10) Patent No.: US 9,749,542 B2
(45) Date of Patent: Aug. 29, 2017

(54) DECODER AND MONITOR SYSTEM

(71) Applicant: Mitsubishi Electric Corporation, Chiyoda-ku (JP)

(72) Inventors: Kenichi Shimbo, Chiyoda-ku (JP); Hironori Terauchi, Chiyoda-ku (JP); Ichio Motegi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/780,842

(22) PCT Filed: May 28, 2014

(86) PCT No.: PCT/JP2014/064107
§ 371 (c)(1),
(2) Date: Sep. 28, 2015

(87) PCT Pub. No.: WO2014/192804
PCT Pub. Date: Dec. 4, 2014

(65) Prior Publication Data
US 2016/0057355 A1 Feb. 25, 2016

(30) Foreign Application Priority Data

May 28, 2013 (JP) ................................ 2013-111998

(51) Int. Cl.
| | | |
|---|---|---|
| *H04N 5/232* | (2006.01) | |
| *H04N 5/247* | (2006.01) | |
| *H04N 19/44* | (2014.01) | |
| *H04N 5/262* | (2006.01) | |

(52) U.S. Cl.
CPC ......... *H04N 5/23293* (2013.01); *H04N 5/247* (2013.01); *H04N 5/2628* (2013.01); *H04N 19/44* (2014.11)

(58) Field of Classification Search
None
See application file for complete search history.

(56) References Cited

U.S. PATENT DOCUMENTS

| | | | | |
|---|---|---|---|---|
| 5,896,128 A | * | 4/1999 | Boyer | .................... H04N 7/152 348/14.09 |
| 6,016,362 A | * | 1/2000 | Kato | ....................... G06T 9/007 348/E5.111 |

(Continued)

FOREIGN PATENT DOCUMENTS

| | | |
|---|---|---|
| JP | 9-46710 A | 2/1997 |
| JP | 11-355758 A | 12/1999 |

(Continued)

OTHER PUBLICATIONS

International Search Report Issued Aug. 19, 2014 in PCT/JP14/064107 Filed May 28, 2014.

(Continued)

*Primary Examiner* — Bernard Krasnic
(74) *Attorney, Agent, or Firm* — Oblon, McClelland, Maier & Neustadt, L.L.P.

(57) ABSTRACT

In an output destination decoder, a desired area receiver receives a desired area, and a cutting-out unit cuts out a desired area from an image input from an output source, and displays the image in the desired area which is cut out.

7 Claims, 17 Drawing Sheets

(56) References Cited

U.S. PATENT DOCUMENTS

| | | | |
|---|---|---|---|
| 6,573,909 B1 * | 6/2003 | Nagao | G06F 3/16 715/727 |
| 2006/0015554 A1 | 1/2006 | Umezaki et al. | |
| 2010/0045826 A1 * | 2/2010 | Ogawa | G06T 3/00 348/241 |
| 2010/0066829 A1 * | 3/2010 | Mizutani | G08B 13/19682 348/143 |
| 2013/0342720 A1 * | 12/2013 | Azami | H04N 9/04 348/222.1 |
| 2014/0014724 A1 * | 1/2014 | Koziol | G06K 7/10851 235/440 |
| 2014/0099066 A1 * | 4/2014 | Jang | G09G 5/006 386/230 |
| 2014/0119712 A1 * | 5/2014 | Jang | H04N 9/80 386/248 |

FOREIGN PATENT DOCUMENTS

| | | | |
|---|---|---|---|
| JP | 2000-278583 A | | 10/2000 |
| JP | 2003-219389 A | | 7/2003 |
| JP | 2004-88483 A | | 3/2004 |
| JP | 2006-33126 A | | 2/2006 |
| JP | 2006-33257 A | | 2/2006 |
| JP | 2007-81465 A | | 3/2007 |
| JP | 2008-306355 A | | 12/2008 |
| JP | 201217513 A | * | 9/2012 |

OTHER PUBLICATIONS

Extended European Search Report issued on Dec. 9, 2016 in Patent Application No. 14803400.2.

* cited by examiner (a)

(b)

(c)

(d)

$F_3$ $F_2$ $F_1$
(a)

(b)

(c)

(d)

(a)

(b)

US 9,749,542 B2

DECODER AND MONITOR SYSTEM

CROSS REFERENCE TO RELATED APPLICATIONS

This application is the national stage entry under 35 U.S.C. 371 of PCT/JP2014/64107, filed May 28, 2014, and which claims priority to JP 2013-111998, filed May 28, 2013. The entire contents of these applications are incorporated by reference herein.

TECHNICAL FIELD

The present invention relates to a decoder and a monitor system.

BACKGROUND ART

Recently, digital broadcasting typified by digital terrestrial broadcasting has been started, and high-definition broadcasting has become a standard. At the same time, as for a video camera for shooting a video image, high-definition shooting is becoming a standard.

As compared with SD (Standard Definition) video up to now, the high-definition video shooting increases the number of pixels sharply. The number of pixels per frame of the full HD video is 1920 by 1080 as compared with that of the SD video of 640 by 480, which is about six times greater than that of the SD video.

In addition, as for a wide area monitor system, an increasing number of systems have come to employ the high-definition video recently. However, since conventional SD video equipment is left in a lot of existing systems, unless the replacement of the systems has been completed, these systems coexist.

For example, in a system with a full HD camera and an SD resolution monitor mixed together, a high-definition video signal usually undergoes reduction to the SD resolution to be displayed on a monitor. This enables the full HD camera and the SD resolution monitor to coexist. Thus, although the user can look out over a visual field of the full HD camera by visual inspection, since the image information is compressed by the reduction, the resolution is reduced by that amount, which is likely to hinder the monitoring operation.

A Patent Document 1 proposes a method that creates a reduced image by reducing the resolution of a high-definition image a full HD camera takes to a resolution corresponding to that of a display device, and executes the following processing to prevent a focusing job or the like from being hindered: extracting a prescribed image area to be focused from the high-definition video signal; creating a video signal for focusing while maintaining the resolution of the image in the extracted area at the resolution of the high-definition video signal; and superimposing the focusing image and the reduced image to be displayed on a monitoring display screen in a juxtaposed manner (placing them at the upper and lower portions) of the screen, for example).

In addition, a Patent Document 2 proposes a method that sets a designated area when transferring image data of a still image; transfers the high resolution image data for the designated area; and transfers low resolution image data for the area other than the designated area.

PRIOR ART DOCUMENT

Patent Document

Patent Document 1: Japanese Patent Laid-Open No. 2006-33126.
Patent Document 2: Japanese Patent Laid-Open No. 2007-81465.

DISCLOSURE OF THE INVENTION

Problems to be Solved by the Invention

A wide area monitor system generally utilizes a plurality of cameras in a plurality of monitoring stations.

For example, let us take an example of a wide area monitor system with two full HD cameras and two monitoring stations.

An encoder A is installed at a full HD camera A side, and an encoder B is installed at a full HD camera B side. The encoders each distribute an image compressed and encoded to the SD resolution to a network by multicasting. The multicast data of the SD resolution image distributed is decoded by a decoder C in a monitoring station C and by a decoder D in a monitoring station D, and is displayed on the SD resolution monitor of each monitoring station.

Here, let us consider a case where users watch the image of the full HD camera A in both the monitoring station C and monitoring station D, and they request to observe an area C of the image of the full HD camera A at the high resolution in the monitoring station C and to observe an area D of the image of the full HD camera A at the high resolution in the monitoring station D.

The area C and area D in this case correspond to the extracted areas in the foregoing Patent Document 1, or to the designated area in the foregoing Patent Document 2. Accordingly, it is conceivable to apply the conventional techniques disclosed in the Patent Document 1 and Patent Document 2 to the wide area monitor system. However, in the case of the wide area monitor system, the monitoring station C and the monitoring station D send a request to achieve the high resolution of the different areas to the encoder A, but it is natural that the encoder A cannot fulfill the request of both the monitoring station C and monitoring station D at the same time. It can only carry out a request from only one monitoring station. Suppose that the encoder A accepts only the request for the area C from the monitoring station C, the monitoring station D is compelled to receive the area C which it does not request at the high resolution, which will hinder the monitoring operation.

In other words, in the conventional techniques, the location of the area to be displayed at the high resolution is uniquely specified, and it is impossible for a plurality of monitoring stations to observe different areas at the high resolution.

Incidentally, the foregoing problem is not limited to the wide area monitor system only, but a problem common to systems that have a plurality of output destinations, to which the same image is supplied from an output source.

The present invention is implemented to solve the foregoing problem. Therefore it is an object of the present invention to enable an output destination of each monitoring station to observe any desired area in an image without being affected by other output destination (monitoring station, for example).

Means for Solving the Problems

A decoder in accordance with the present invention comprises: a data receiver that receives image data; a decoder that decodes the image data the data receiver receives; a desired area receiver that receives a desired area; a cutting-out unit that cuts out, from an image obtained from the image data the decoder decodes, the desired area the desired area receiver receives; and an image forming unit that reduces or enlarges the area the cutting-out unit cuts out to a prescribed image size.

Advantages of the Invention

According to the invention, each output destination can observe any desired area in the image without being affected by the other output destination.

BEST MODE FOR CARRYING OUT THE INVENTION

The best mode for carrying out the invention will now be described with reference to the accompanying drawings to explain the present invention in more detail.

Embodiment 1

An embodiment 1 in accordance with the present invention will now be described with reference to FIGS. 1-5.

Figure 1:
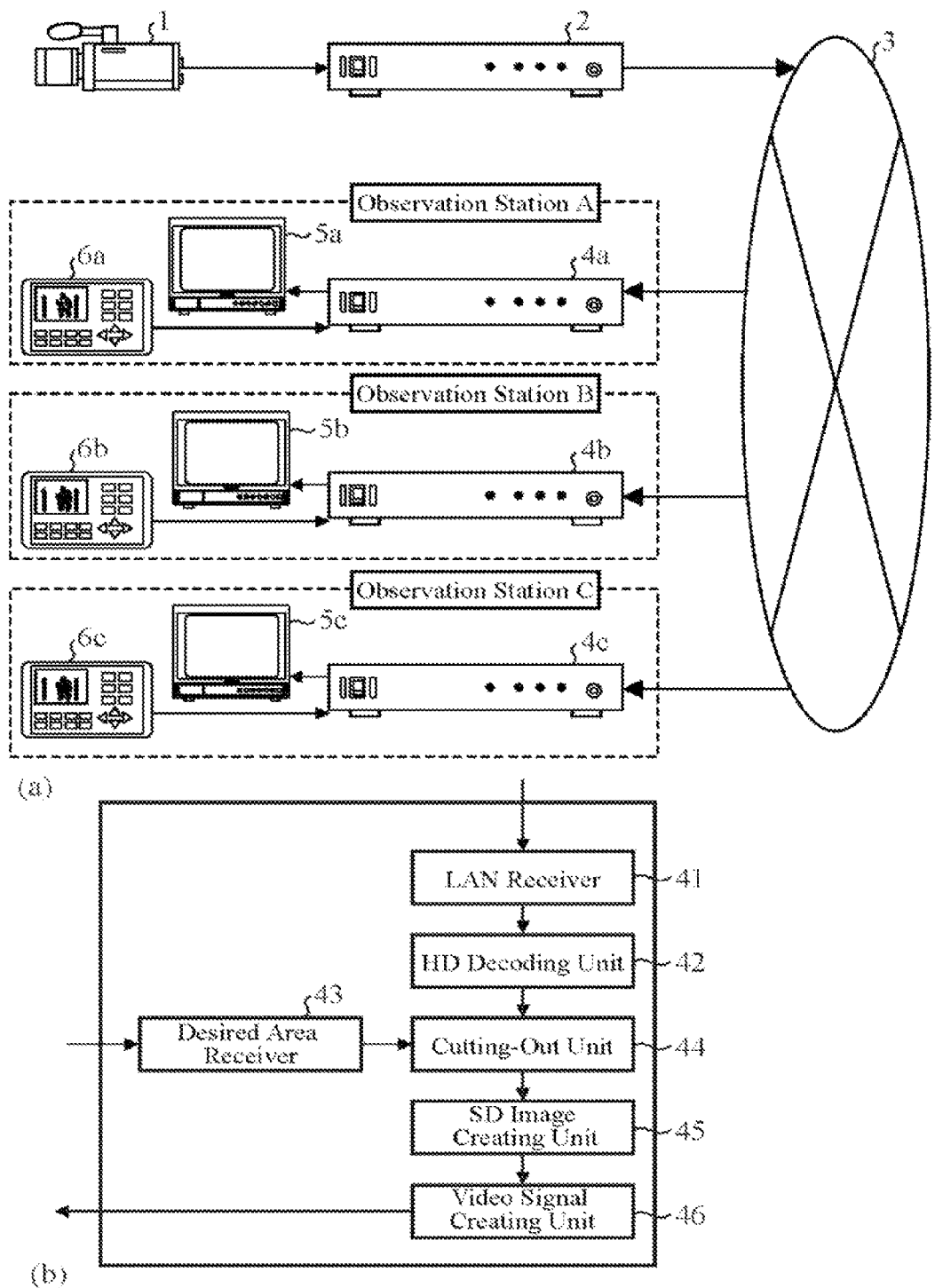
FIG. 1 is a diagram showing a decoder and a system with the decoder of an embodiment 1 in accordance with the present invention.

FIG. 1 is a diagram showing a decoder and a system with the decoder of the embodiment 1 in accordance with the present invention: FIG. 1(a) shows the whole system; and FIG. 1(b) shows a configuration of the decoders in the system. Incidentally, in the drawings, the same reference symbols designate the same or corresponding components.

FIG. 1(a) shows a full HD camera 1 (referred to as "HD camera 1" from now on), a high-definition encoder 2 (referred to as "HD encoder 2" from now on), a network 3, decoders 4a, 4b and 4c, SD resolution monitors 5a, 5b and 5c, and consoles 6a, 6b and 6c.

The HD camera 1 takes a full HD image (referred to as "HD image" from now on) of 1920 pixels by 1080 lines together with a microphone output voice.

The HD encoder 2 encodes the HD image and microphone output voice the HD camera 1 outputs. The encoded data is transmitted through the network 3. As for the transmission of the encoded data, a rate of about 8 Mbps is common in a coding format H.264. Here, a UDP (User Datagram Protocol) multicasting stream is supposed.

To the network 3, the HD encoder 2 and the decoders 4a, 4b and 4c are connected.

As for the decoders, the decoder 4a is installed in a monitoring station A, the decoder 4b in a monitoring station B, and the decoder 4c in a monitoring station C, and they receive the encoded data the HD encoder 2 distributes from the network 3 and decode it.

As for the SD resolution monitors, the SD resolution monitor 5a is installed in the monitoring station A, the SD resolution monitor 5b in the monitoring station B, and the SD resolution monitor 5c in the monitoring station C, and the SD resolution monitor 5a displays an image the decoder 4a decodes, the SD resolution monitor 5b displays an image the decoder 4b decodes, and the SD resolution monitor Sc displays an image the decoder 4c decodes.

As for the consoles, the console 6a is installed in the monitoring station A, the console 6b in the monitoring station B, and the console 6c in the monitoring station C, and the console 6a is provided with an I/F (interface) for an operator to input an instruction to the decoder 4a, the console 6b with an I/F for an operator to input an instruction to the decoder 4b, and the console 6a with an I/F for an operator to input an instruction to the decoder 4a.

FIG. 1(b) shows an internal configuration of the decoder 4a, 4b or 4c. It comprises a LAN receiver 41, an HD decoding unit 42, a desired area receiver 43, a cutting-out unit 44, an SD image creating unit 45, and a video signal creating unit 46.

The LAN receiver 41 receives a UDP packet and the like from the network 3.

The HD decoding unit 42 decodes the data the LAN receiver 41 receives, and restores the HD image.

The desired area receiver 43 receives a desired area input from the corresponding console 6a, 6b or 6c, and sets it.

The cutting-out unit 44 cuts out the desired area input by the desired area receiver 43 from the HD image the HD decoding unit 42 decodes.

The SD image creating unit 45 reduces or enlarges the desired area cut out by the cutting-out unit 44 to fit it to an SD size image.

The video signal creating unit 46 converts the SD image received from the SD image creating unit 45 to a composite video signal or the like, and outputs it.

Next, the operation of the embodiment 1 in accordance with the present invention with the foregoing configuration will be described.

Figure 2:
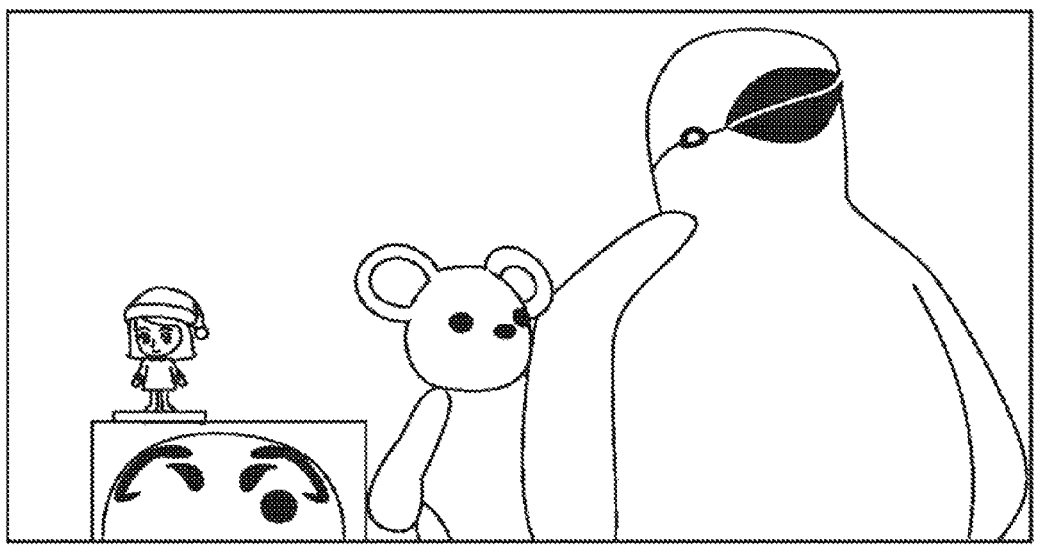
FIG. 2 is a diagram showing an example of a full HD image a full HD camera of the embodiment 1 in accordance with the present invention takes.

The HD camera 1 takes an HD image of 1920 pixels by 1080 lines. The image, which is shown in FIG. 2, is supplied to the HD encoder 2. The image shown in FIG. 2 is an example for reference, and the image contents themselves do not have any meaning. Incidentally, it is shown as a line drawing in FIG. 2.

Receiving the HD image of 1920 pixels by 1080 lines, the HD encoder 2 executes encoding according to a coding format such as the H.264 format. Generally, the encoded data created is converted to an RTP (Realtime Transport Protocol) stream with an RTP header attached to it, and is distributed to the network 3 as a UDP/IP packet. However, as for the coding format and the header structure, they are only an example for reference, and it goes without saying that they can be other format. A UDP/IP packet can be replaced by a TCP/IP packet.

The network 3 carries a distribution packet. Incidentally, although it is drawn as a LAN in FIG. 1, it can be a WAN extending over a wide area via a backbone. Besides, it can be either wired or wireless. When the coding format is H.264, although the rate of the distributed stream is generally about 8 Mbps, the distribution rate is not specified. Only, it is necessary for the network 3 to have a bandwidth for transferring at the distribution rate.

The distribution packet arrives at the decoders 4a, 4b and 4c. The operation of the decoder thereafter will be shown in FIG. 5 as a flowchart. The distribution packet that arrives from the network 3 is received by the LAN receiver 41 of each decoder. Generally, it corresponds to a protocol stack in an F/W (Firmware) in the apparatus. The LAN receiver 41 interprets the RTP header or the like, extracts and arranges only a necessary data section, and delivers to the next process. The data delivered to the next process is the encoded data itself the HD encoder 2 creates (step ST1).

The HD decoding unit 42 decodes the encoded data supplied from the LAN receiver 41 to the original HD image, that is, to the HD image of 1920 pixels by 1080 lines (step ST2). However, it does not deliver the image to the SD resolution monitor.

An operator designates a desired area via the console (step ST3).

The instruction is received by the desired area receiver 43 which sets the desired area (step ST4).

Figure 3:
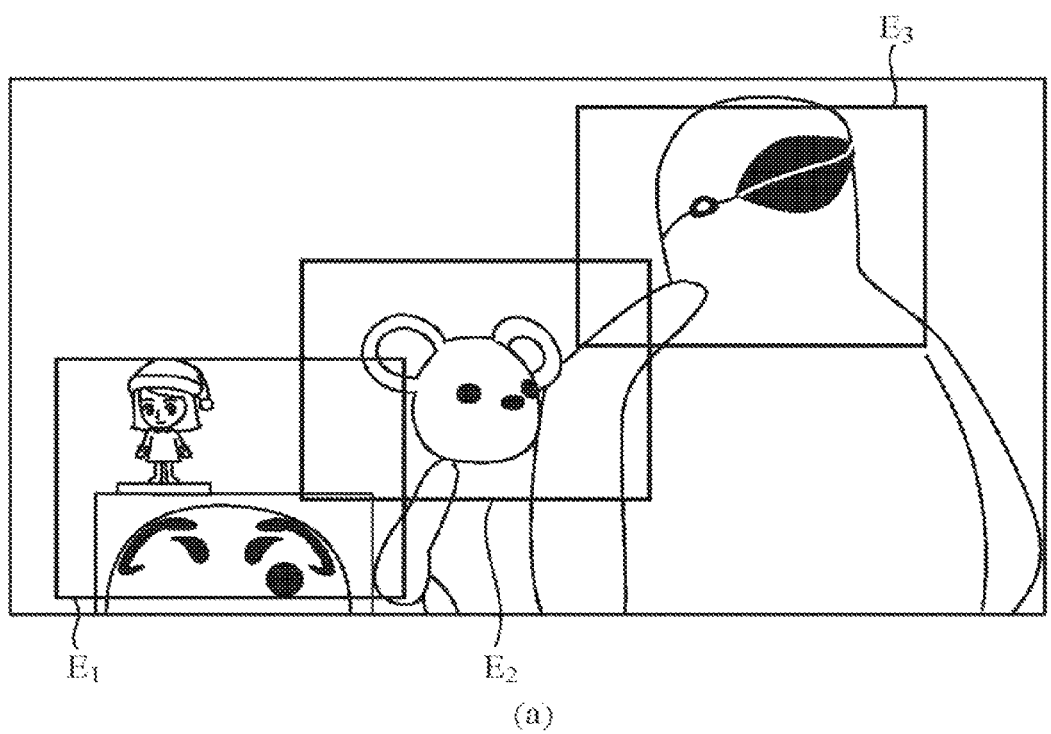
FIG. 3 is a diagram showing an example of desired areas an operator instructs.
Figure 3:
Figure 3:
Figure 3:

FIG. 3 shows an example of desired areas. The image shown in FIG. 3(a) is the HD image the HD decoding unit 42 decodes, which is the same as the HD image of 1920 pixels by 1080 lines shown in FIG. 2. Assume that the desired area the operator inputs shifts in order of areas $E_1 \rightarrow E_2 \rightarrow E_3$. The areas $E_1$, $E_2$ and $E_3$ are an area with the size of 640 pixels by 480 lines each, and are each designated by the operator in such a manner that the operator slides the desired area with a joystick from the console at hand.

The cutting-out unit 44 cuts out the target areas appropriately from the HD image decoded by the HD decoding unit 42 in accordance with the instruction from the operator. In this case, the areas indicated by the frames of the area $E_1$, $E_2$ and $E_3$ are cut out in order (step ST5).

The images in the cut-out areas by the cutting-out unit 44 are delivered to the SD image creating unit 45. Since the images are an SD image already, the SD image creating unit 45 delivers them to the next process without compression (step ST6).

The video signal creating unit 46 converts the SD images it receives from the SD image creating unit 45 to a signal with a format capable of being displayed on the SD resolution monitor (composite signal, for example), and outputs it (step ST7).

FIG. 3(b) shows an example of the area $E_1$ image, FIG. 3(c) shows that of the area $E_2$ image, and FIG. 3(d) shows that of the area $E_3$ image, which are displayed on the SD resolution monitor, respectively. In the examples, the desired areas are displayed in order of FIG. 3(b) FIG. 3(c) FIG. 3(d) in accordance with the instruction of the operator.

In addition, as for the processing after the distribution packet arrives at the decoders 4a, 4b and 4c from the network 3, the monitoring stations A, B and C can execute it independently from each other. As for an instruction the operator issues, and as for receiving the instruction by the decoder and creating the SD image in accordance with the instruction, they are closed in each monitoring station and do not affect to the other monitoring stations.

Thus, each monitoring station can set any desired areas without being affected from the other monitoring stations.

The monitoring stations can consider the foregoing processing as "pan-tilt scrolling of an SD image". Although it is the limited scrolling within the range of the HD image shown in FIG. 3(a), since it can be considered as the scrolling in accordance with the instruction of the operator, we call it pseudo-scrolling.

Next, the operation for setting the desired areas, which differs from the foregoing pseudo-scrolling will be described.

Figure 4:
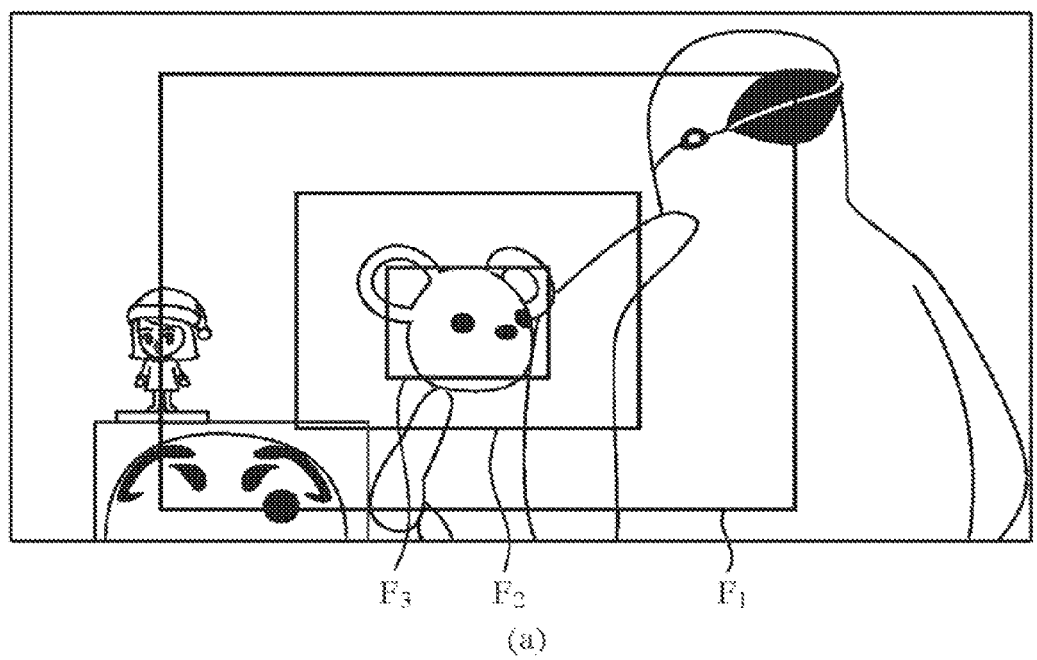
FIG. 4 is a diagram showing an example of desired areas an operator instructs.
Figure 4:
Figure 4:
Figure 4:

An example of desired areas in this case is shown in FIG. 4. FIG. 4(a) shows the HD image decoded by the HD decoding unit 42. Assume in FIG. 4 that the desired areas the operator inputs shift in such a manner as areas $F_1 \rightarrow F_2 \rightarrow F_3$ in order. In addition, assume that the size of the area $F_1$ is 1280 pixels by 960 lines, the size of the area $F_2$ is 640 pixels by 480 lines, and the size of the area $F_3$ is 320 pixels by 240 lines, and that the operator instructs them in such a manner as to enlarge or reduce the desired areas with a zoom-in/zoom-out button from the console at hand.

The cutting-out unit 44 cuts out the target areas appropriately from the HD image decoded by the HD decoding unit 42 in accordance with the instruction from the operator. In this case, it cuts out the areas indicated by the frames of the areas $F_1$, $F_2$ and $F_3$ in order. The images of the areas cut out are delivered to the SD image creating unit 45.

Here, the images of the areas $F_1$ and $F_3$ are not an SD image. Accordingly, the SD image creating unit 45 compresses/expands the images to the SD size, thereby converting it to an image of 640 pixels by 480 lines.

The video signal creating unit 46 converts the SD image it receives from the SD image creating unit 45 to a signal with a format capable of being displayed on the SD resolution monitor (composite signal, for example) and outputs it.

FIG. 4(b) shows an area $F_1$ image, FIG. 4(c) shows an area $F_2$ image, and FIG. 4(d) shows an area $F_3$ image, which are displayed on the SD resolution monitor, respectively. In the examples, the desired areas are displayed in order of FIG. 4(b) FIG. 4(c)→FIG. 4(d) in accordance with the instruction of the operator.

In the same manner as described about the pseudo-scrolling, the monitoring stations A, B and C can execute the foregoing processing independently from each other. As for an instruction the operator issues, and as for receiving the instruction by the decoder and then creating the SD image in accordance with the instruction, they are closed in each monitoring station, and do not affect to the other monitoring stations.

Thus, each monitoring station can set any desired area without being affected from the other monitoring stations.

The processing described above can be considered as "zoom in/zoom out of the SD image" in the monitoring station. Although it is limited zoom in/zoom out within the range of the HD image shown in FIG. 3(a), since it is considered as the zoom in/zoom out in accordance with the instruction of the operator, we call it pseudo-zoom in/zoom out.

Incidentally, although an example of the wide area monitor system is described above, it goes without saying that the present invention is applicable to a system as long as it has a plurality of output destinations to which the same image is input from an output source.

In addition, although the foregoing explanation shows an example in which the apparatus with the HD specifications of 1920 pixels by 1080 lines is mixed together with the apparatus with the SD specifications of 640 pixels by 480 lines, a configuration other than the HD and SD is also possible as long as it has resolutions different from each other.

In such a case, the LAN receiver corresponds to the data receiver, the HD decoding unit corresponds to the decoding unit, and the SD image creating unit corresponds to the image forming unit.

As described above, according to the present embodiment 1, each output destination can observe any desired area in an image without being affected by the other output destinations.

In addition, when the resolution of an originally acquired image is higher than the resolution of the corresponding output destination apparatus, it can make the picture quality of any area in the image to be observed at the output destination equal to the picture quality of the originally acquired image, thereby being able to carry out pseudo-pan-tilt zoom.

In particular, when the present embodiment is applied to the foregoing wide area monitor system, even if the plurality of monitoring stations request any different areas as the desired areas, each monitoring station can determine the desired areas independently and freely, thereby being able to prevent the monitoring stations from contending for the desired areas between them. In addition, since each monitoring station can cut out any desired areas of the SD size from an image taken with the HD camera with the same high resolution as the HD camera freely, each monitoring station can display the HD camera image on the SD resolution monitor, and can offer an advantage that each monitoring station can virtually perform pan-tilt zooming independently according to the instruction of the operator using the same single camera (pseudo-pan-tilt zooming).

Embodiment 2

An embodiment 2 in accordance with the present invention will be described with reference to FIGS. 6 and 7.

Figure 6:
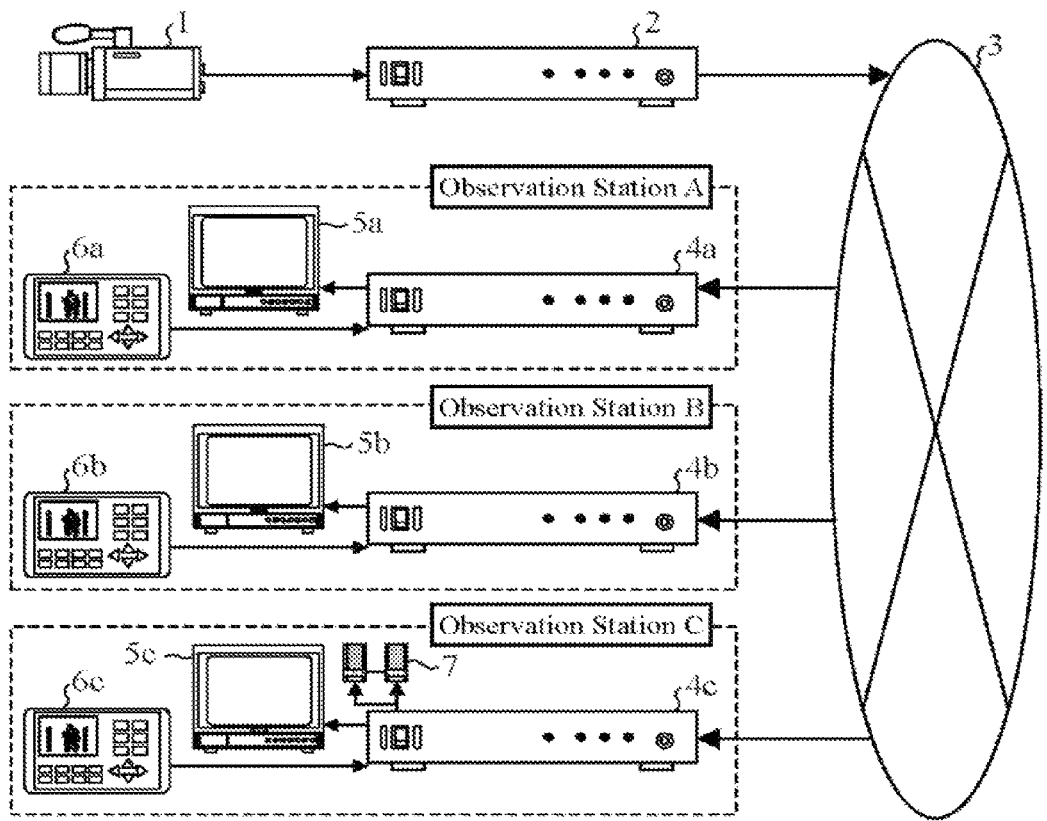
FIG. 6 is a diagram showing a decoder and a system with the decoder of an embodiment 2 in accordance with the present invention.
Figure 6:
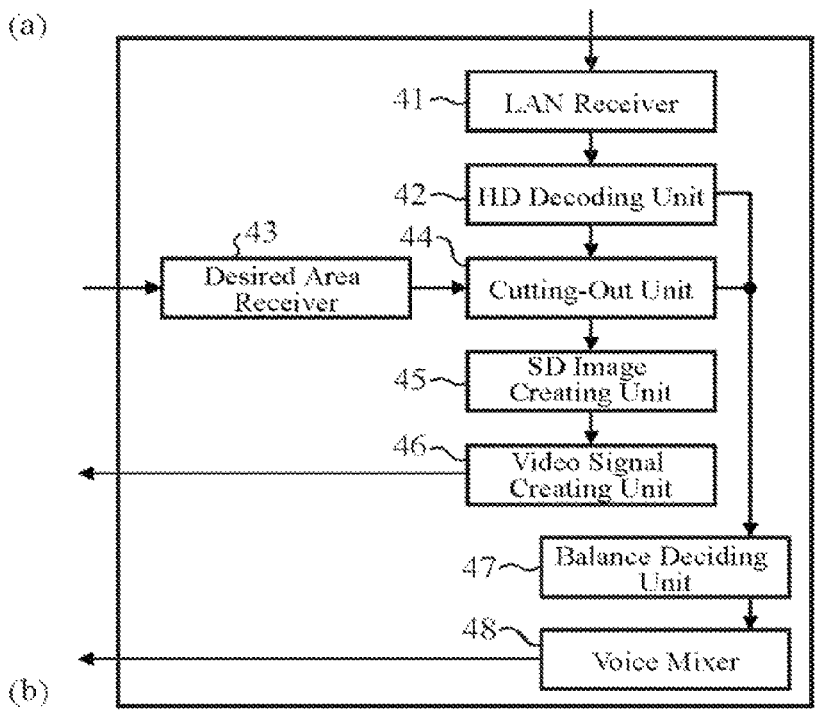

FIG. 6 is a diagram showing a decoder and a system with the decoder of the embodiment 2 in accordance with the present invention: FIG. 6(a) shows the whole system; and FIG. 6(b) shows a configuration of the decoders in the system. Incidentally, in the drawings, the same reference symbols designate the same or corresponding components. In addition, as for the components that have already been described in the embodiment 1, their description will be omitted suitably.

FIG. 6(a) comprises in addition to the configuration shown in FIG. 1(a) stereo speakers 7 in the monitoring station C. The stereo speakers 7 are provided for outputting a voice of stereo microphones of the HD camera 1, and are placed near the SD resolution monitor 5c in general.

Incidentally, although FIG. 6 shows a configuration that comprises the stereo speakers in only the monitoring station C, they can also be set in the monitoring station A and/or monitoring station B.

FIG. 6(b) shows, as an internal configuration of the decoders 4a, 4b and 4c, the LAN receiver 41, the HD decoding unit 42, the desired area receiver 43, the cutting-out unit 44, the SD image creating unit 45, the video signal creating unit 46, a balance deciding unit 47, and a voice mixer 48.

The LAN receiver 41 receives a UDP packet and the like from the network 3.

The HD decoding unit 42 decodes the data the LAN receiver 41 receives, and restores the HD image and stereo voice.

The desired area receiver 43 receives a desired area input from the corresponding console among the consoles 6a, 6b and 6c.

The cutting-out unit 44 cuts out the desired area input from the desired area receiver 43 from the HD image the HD decoding unit 42 decodes.

The SD image creating unit 45 reduces or enlarges the desired area cut out by the cutting-out unit 44 in such a manner as to fit to an SD size image.

The video signal creating unit 46 converts the SD image delivered from the SD image creating unit 45 to a composite video signal or the like, and outputs it.

The balance deciding unit 47 calculates the center line of the image of the area cut out by the cutting-out unit 44, and calculates the location of the center line in the HD image the HD decoding unit 42 decodes.

The voice mixer 48 controls the right and left volumes of the stereo voices in accordance with the center line the balance deciding unit 47 calculates.

Next, the operation of the embodiment 2 in accordance with the present invention with the foregoing configuration will be described.

The HD camera 1 takes an HD image of 1920 pixels by 1080 lines together with the stereo microphone output voice. The image is one shown in FIG. 2, and is supplied to the HD encoder 2 together with the stereo microphone output voice. The image shown in FIG. 2 is only an example for reference, and the image contents themselves do not have any meaning.

The HD encoder 2, receiving the HD image of 1920 pixels by 1080 lines and the stereo microphone output voice, encodes them with the coding format like H.264. Generally, the encoded data created is converted to an RTP stream with an RTP header attached, and is distributed to the network 3 as a UDP/IP packet. The coding format and header structure are only an example for reference, and they can take other format. The UDP/IP packet can be replaced by a TCP/IP packet.

The network 3 carries a distribution packet. Incidentally, although it is drawn as a LAN in FIG. 6, it can be a WAN extending over a wide area via a backbone. Besides, it can be either wired or wireless. When the coding format is H.264, although the rate of the distributed stream is generally about 8 Mbps, the distribution rate is not specified. Only, it is necessary for the network 3 to have a bandwidth for transferring at the distribution rate.

The distribution packet arrives at the decoders 4a, 4b and 4c. The distribution packet arriving from the network 3 is received by the LAN receiver 41 of each decoder. Generally, it corresponds to a protocol stack in an F/W in the apparatus. The LAN receiver 41 interprets the RTP header or the like, extracts and arranges only a necessary data section, and delivers it to the next process. The data delivered to the next process is the encoded data itself the HD encoder 2 creates.

The HD decoding unit 42 decodes the encoded data supplied from the LAN receiver 41 to the original HD image and stereo voice, that is, the decoded image is the HD image of 1920 pixels by 1080 lines. However, it does not yet output the image or voice from the decoder.

An operator designates a desired area via the console.

The instruction is received by the desired area receiver 43 and is set.

Figure 7:
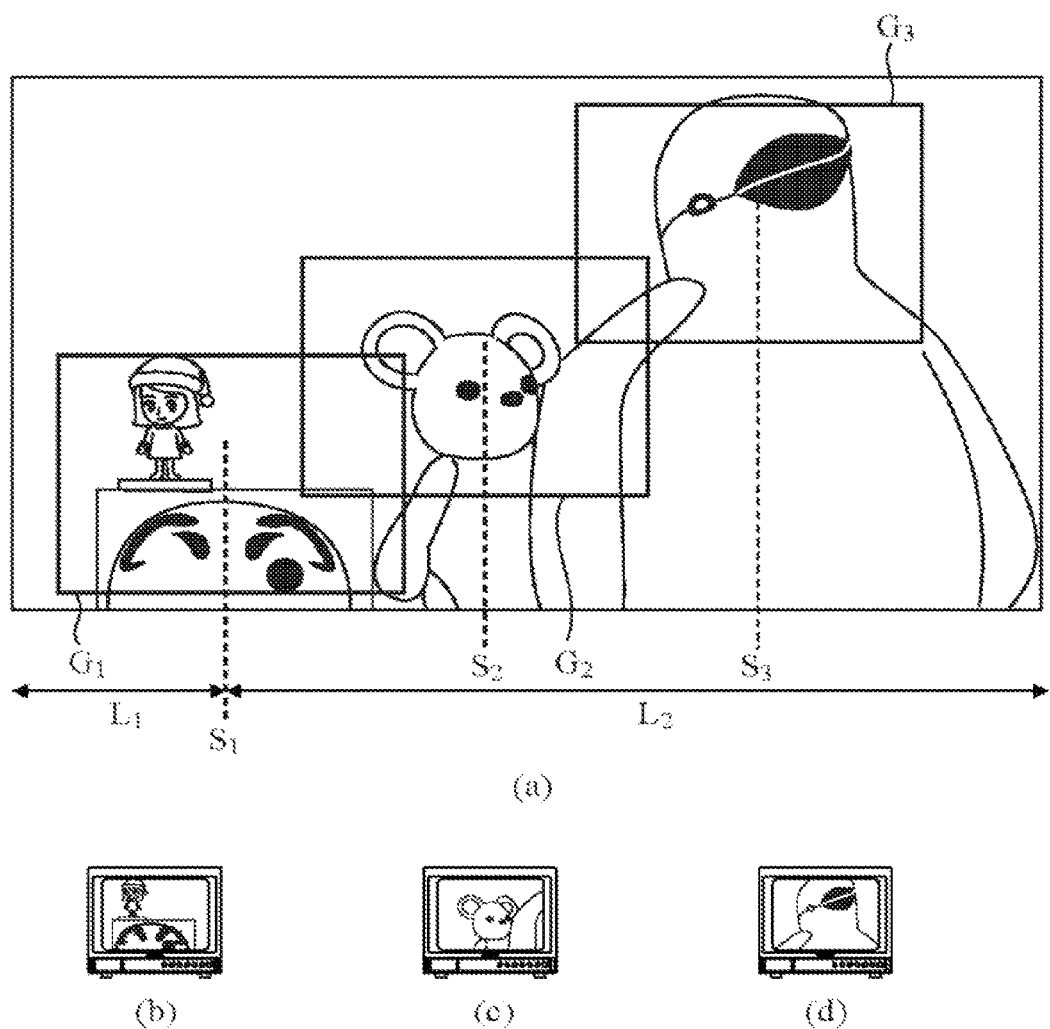
FIG. 7 is a diagram showing an example of desired areas an operator instructs and the center lines of the individual desired areas.

FIG. 7 shows an example of the desired areas. The image shown in FIG. 7(a) is the HD image decoded by the HD decoding unit 42, which is the same as the HD image of 1920 pixels by 1080 lines shown in FIG. 2. Assume that the desired area the operator inputs shifts in order of areas $G_1 \rightarrow G_2 \rightarrow G_3$ in FIG. 7. The areas $G_1$, $G_2$ and $G_3$ are an area of the size of 640 pixels by 480 lines each, and are designated by the operator in such a manner that the operator slides the desired area with a joystick from the console at hand.

The cutting-out unit 44 cuts out the target areas from the HD image decoded by the HD decoding unit 42 appropriately in accordance with the instruction from the operator. In this case, the areas indicated by the frames of the areas $G_1$, $G_2$ and $G_3$ are cut out in order.

The images in the cut-out areas by the cutting-out unit 44 are delivered to the SD image creating unit 45. Since the images are an SD image already, the SD image creating unit 45 delivers them to the next process without compression.

The video signal creating unit 46 converts the SD images it receives from the SD image creating unit 45 to a signal with a format capable of being displayed on the SD resolution monitor (composite signal, for example), and outputs it.

FIG. 7(b) shows an example of the area $G_1$ image, FIG. 7(c) shows that of the area $G_2$ image, and FIG. 7(d) shows that of the area $G_3$ image, which are displayed on the SD resolution monitor, respectively. In the examples, the desired areas are displayed in order of FIG. 7(b)→FIG. 7(c)→FIG. 7(d) in accordance with the instruction of the operator.

In addition, as for the processing after the distribution packet arrives at the decoders 4a, 4b and 4c from the network 3, the monitoring stations A, B and C can execute it independently from each other. As for an instruction the operator issues, and as for receiving the instruction by the decoder and then creating the SD image in accordance with the instruction, they are closed in each monitoring station, and do not affect to the other monitoring stations.

Thus, each monitoring station can set any desired area without being affected from the other monitoring stations.

Furthermore, the balance deciding unit 47, which has received the information about the cut-out location from the cutting-out unit 44 at this point, calculates the location of the center line of the image, which is currently displayed on the SD resolution monitor, in the HD image before the cut out. As for the areas $G_1$, $G_2$ and $G_3$, locations $S_1$, $S_2$ and $S_3$ shown in FIG. 7(a) are calculated as the center lines. The information about the center lines is output to the voice mixer 48.

According to the center lines the balance deciding unit 47 calculates, the voice mixer 48 carries out balance adjustment of the stereo voice decoded by the HD decoding unit 42 so that the stereo voice conforms with the image.

Let us take a concrete example. When the area $G_1$ has been cut out, the balance deciding unit 47 calculates that the center line is at the location $S_1$. Here, assume that the ratio between the distance $L_1$ from the location $S_1$ the left edge of the ND image before the cutout and the distance $L_2$ from the location $S_1$ to the right edge is 1:4.

At this time, if the voice mixer 48 adjusts the volume on the right side at ⅕ and the volume on the left side at ⅘ in the stereo voice data the HD decoding unit 42 compounds, the sound source virtually shifts to the location $S_1$.

Thus, the voice mixer 48 can shift the virtual location of the sound source to the right or left in accordance with the desired area the operator requests.

The processing described above can be considered as "the pan-tilt scrolling of the SD image including the sound source" in the monitoring station. Although it is the limited scrolling within the range of the HD image shown in FIG. 7(a), since it appears as the scrolling in accordance with the instruction of the operator, we refer it as "pseudo-scrolling with sound source shift".

As described above, according to the present embodiment 2, it offers besides the advantages of the embodiment 1 an advantage of being able to shift the sound source virtually in conformity with the pan-tilt scrolling in the image, thereby being able to carry out a comfortable integrated virtual shift of the voice together with the image.

Embodiment 3

An embodiment 3 in accordance with the present invention will now be described with reference to FIG. 8-FIG. 12.

In the embodiments 1 and 2, the description is given on the assumption that the number of the HD camera 1 is one, and that the HD camera 1 is a fixed HD camera with its angle being fixed to a certain angle of view. In the embodiment 3, an example using a swivel HD camera 1a will be described which takes pictures while turning within the angle of 180 degrees or 360 degrees in a certain period of time (such as one or five minutes). A single high quality image (referred to as a "surrounding high quality image" from now on) which reflects a wide area is created from a plurality of HD images the HD camera 1a takes, and the cutting-out unit 44 cuts out an area from it.

Figure 8:
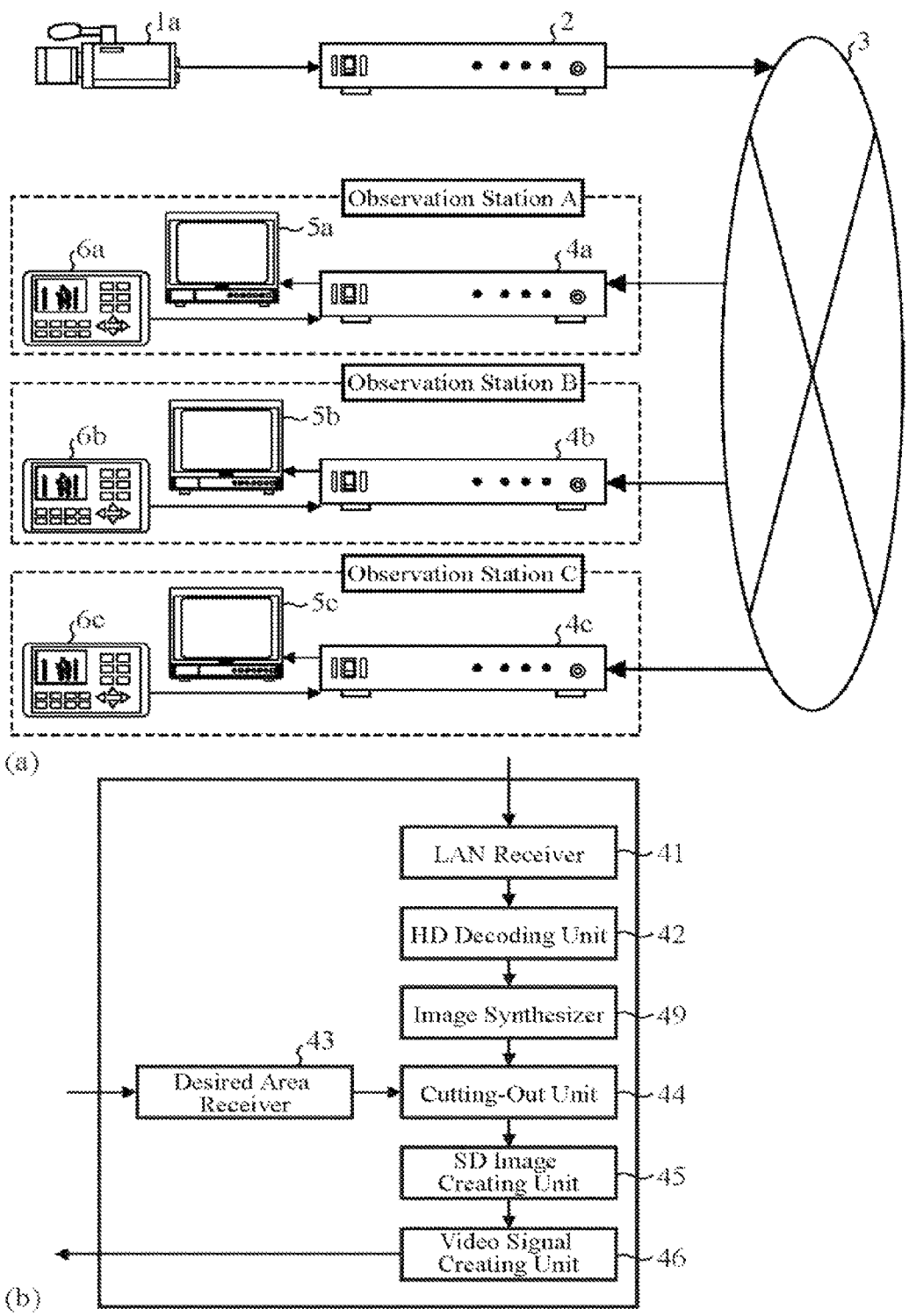
FIG. 8 is a diagram showing a decoder and a system with the decoder of an embodiment 3 in accordance with the present invention.

FIG. 8 is a diagram showing a decoder and a system with the decoder of the embodiment 3. FIG. 8(a) shows the whole system; and FIG. 8(b) shows a configuration of the decoders in the system. Incidentally, in the drawings, the same reference symbols designate the same or corresponding components. In addition, as for the components that have already been described in the embodiment 1, their description will be omitted properly.

In FIG. 8(a), instead of the HD camera 1 shown in FIG. 1(a), the HD camera 1a is placed which takes a picture while turning.

FIG. 8(b) shows, as an internal configuration of the decoders 4a, 4b and 4c, the LAN receiver 41, the HD decoding unit 42, the desired area receiver 43, the cutting-out unit 44, the SD image creating unit 45, the video signal creating unit 46, and an image synthesizer 49.

As for the functions of the LAN receiver 41, HD decoding unit 42, desired area receiver 43, SD image creating unit 45, and video signal creating unit 46, they are the same as those having been described already in the embodiment 1.

The image synthesizer 49, using a widely known image processing technique, synthesizes a plurality of HD images the HD decoding unit 42 restores by decoding, and forms a single surrounding high quality image. For example, when the HD camera 1*a* takes pictures while turning within the angle of 180 degrees in one minute, the image synthesizer 49 synthesizes the plurality of HD images which are output from the HD camera 1*a* during the one minute and which the HD decoding unit 42 decodes to form the single surrounding high quality image. The surrounding high quality image in this case is an image that reflects the range of 180 degrees.

The cutting-out unit 44 cuts out the desired area input from the desired area receiver 43 from the surrounding high quality image the image synthesizer 49 creates.

Next, the operation of the embodiment 3 in accordance with the present invention with the foregoing configuration will be described.

The flow up to that the HD images the HD camera 1*a* takes arrive at the decoders 4*a*, 4*b* and 4*c* as a distribution packet via the HD encoder 2 and network 3 is the same as the flow that has already been described in the embodiment 1. As for the operation of the decoder after the distribution packet has arrived at the decoders 4*a*, 4*b* and 4*c*, FIG. 9 shows in the flowchart.

Figure 5:
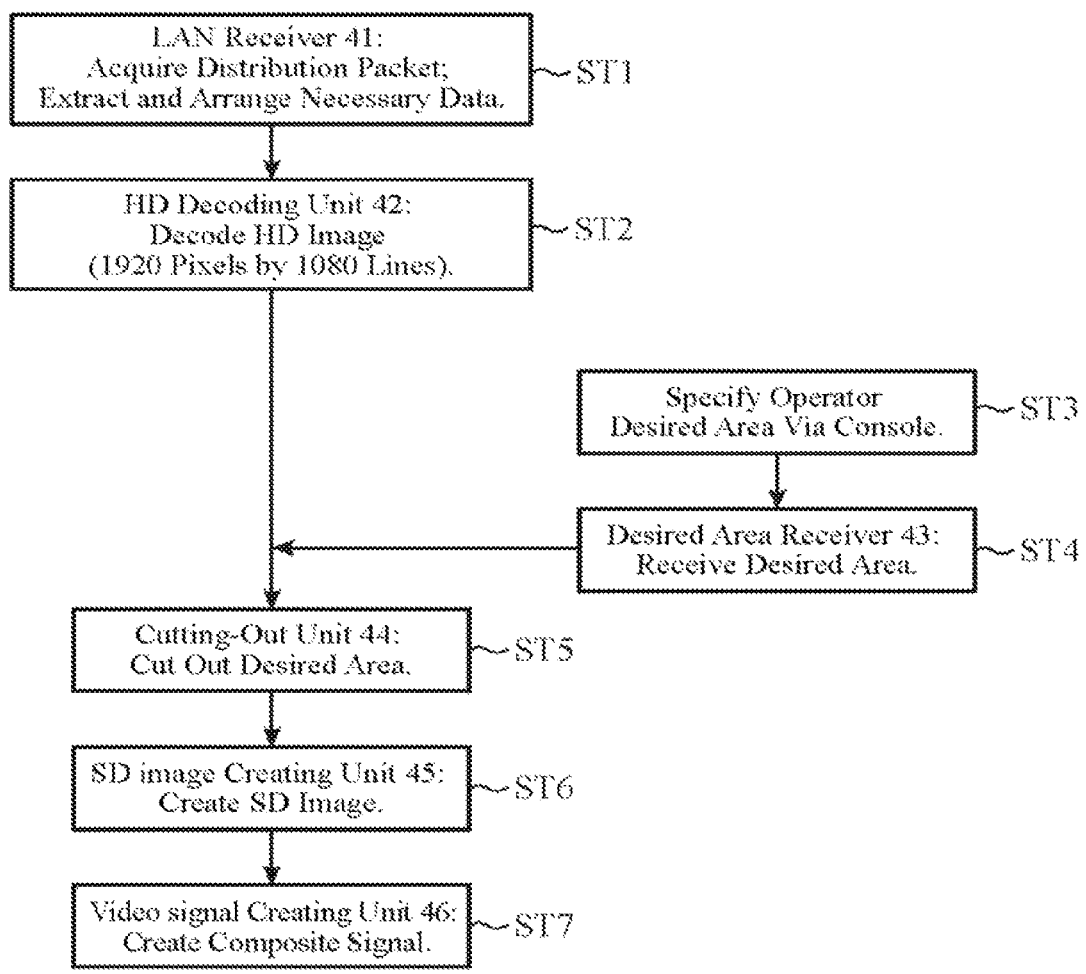
FIG. 5 is a flowchart showing a processing flow of various units of the decoder of the embodiment 1 in accordance with the present invention.
Figure 9:
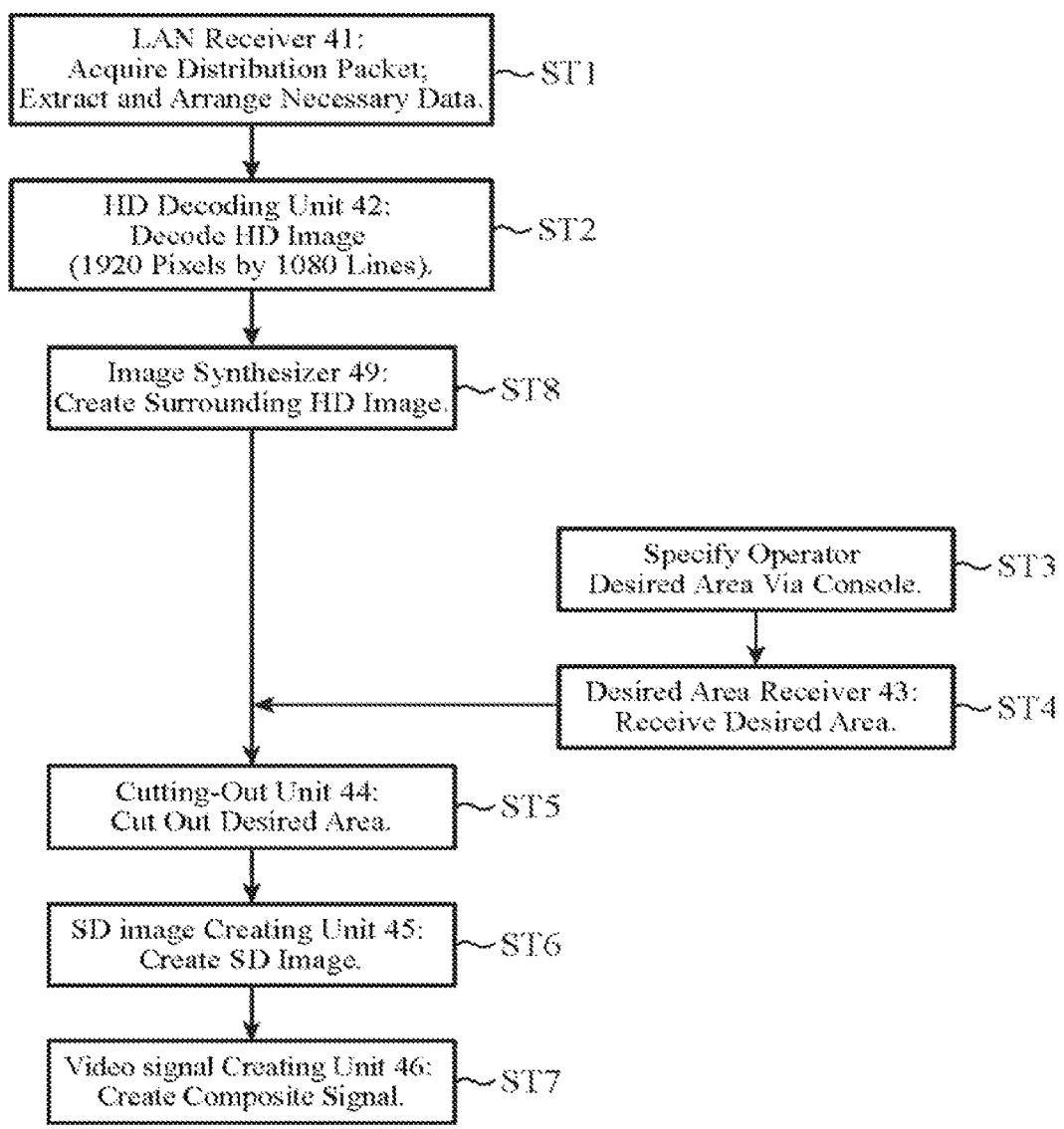
FIG. 9 is a flowchart showing a processing flow of various units of the decoder of the embodiment 3 in accordance with the present invention.

At steps ST1 and ST2 shown in FIG. 9, the same processing as the processing at steps ST1 and ST2 shown in FIG. 5 is executed. Incidentally, the processing at steps ST1 and ST2 is executed repeatedly for a fixed period of time (one minute or five minutes, for example) while the HD camera 1*a* takes the HD images necessary for forming a single surrounding high quality image.

The image synthesizer 49 synthesizes the plurality of HD images the HD decoding unit 42 decodes to form a single surrounding high quality image (step ST8).

At steps ST3 and ST4 shown in FIG. 9, the same processing as the processing at steps ST3 and ST4 shown in FIG. 5 is executed.

According to the instruction from the operator, the cutting-out unit 44 cuts out the desired areas from the surrounding high quality image the image synthesizer 49 forms (step ST5).

At steps ST6 and ST7, the same processing as the processing at steps ST6 and ST7 shown in FIG. 5 is executed.

Thus, according to the decoder of the embodiment 3, the pseudo-scrolling of the surrounding high quality image becomes possible. In addition, when the desired areas the operator instructs differ from the SD size such as the areas $F_1$ and $F_3$ described in the embodiment 1, the SD image creating unit 45 enables the pseudo-zoom in/zoom out by compressing/expanding the images of the desired areas to the SD size.

Incidentally, instead of taking pictures while turning the single HD camera 1*a*, a configuration is also possible in which a plurality of HD cameras 1 are fixed at different angles of view, and take pictures in the range of 180 degrees, 360 degrees or the like with all the cameras. In this case, a single high quality image (referred to as a "simultaneous surrounding high quality image" from now on) which reflects a wide area is created from the plurality of HD images the plurality of HD cameras 1 take simultaneously, and the cutting-out unit 44 cuts out an area from it.

Figure 10:
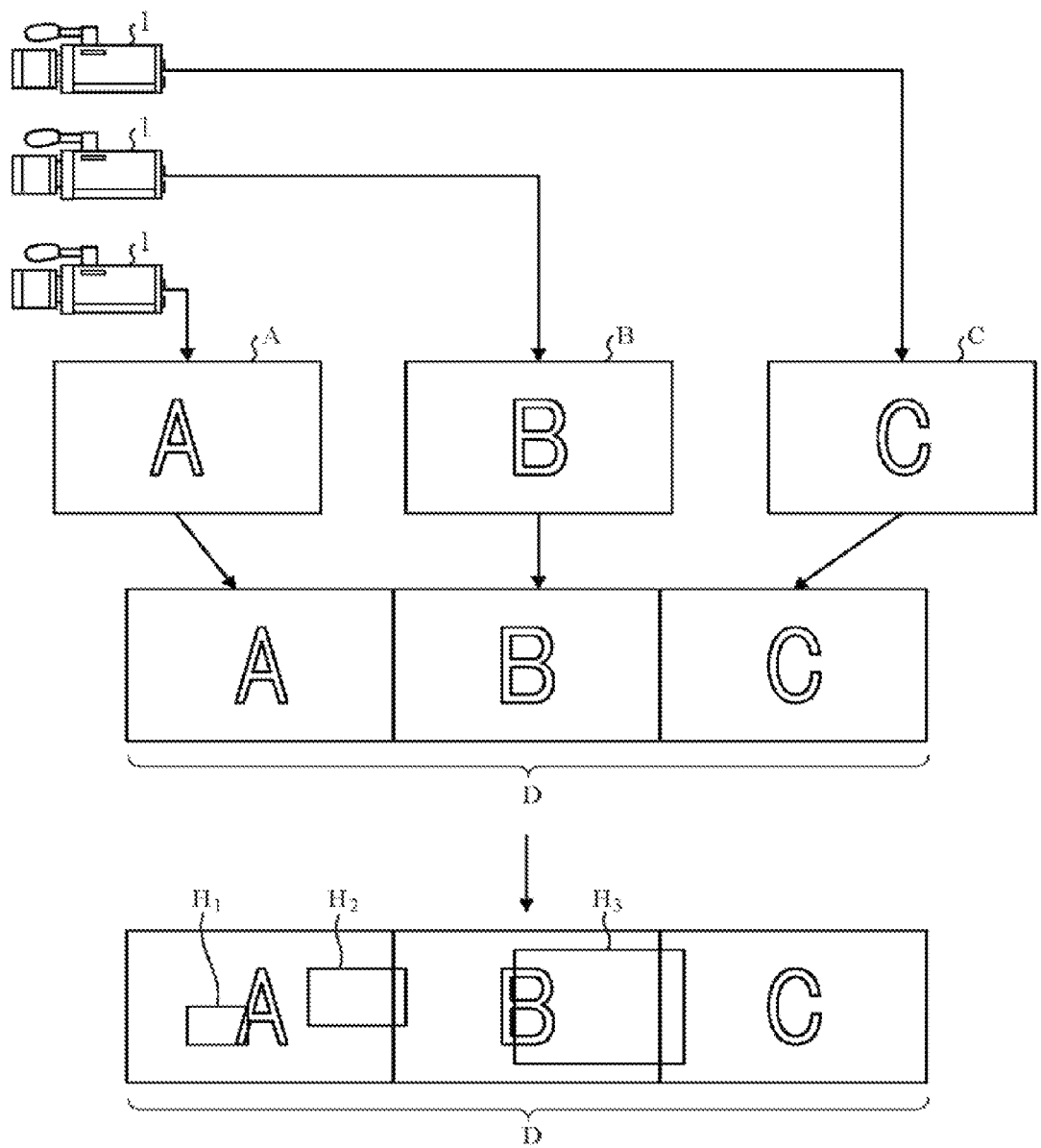
FIG. 10 is a diagram showing a process of the system of the embodiment 3 in accordance with the present invention.

FIG. 10 shows a process of forming the simultaneous surrounding high quality image from the HD images the plurality of HD cameras 1 take, and the areas are cut out from the simultaneous surrounding high quality image. As for FIG. 10, the description will be made with reference to FIG. 8(*b*).

Three HD images A, B and C the three HD cameras 1 take simultaneously are received by the LAN receiver 41 as a distribution packet as having been described already in the embodiment 1, followed by decoding to the HD images A, B and C by the HD decoding unit 42.

The image synthesizer 49 synthesizes the three HD images A, B and C the HD decoding unit 42 restores by decoding, and forms a single simultaneous surrounding high quality image D. If the HD images A, B and C are an image of taking a range of 60 degrees each, for example, the simultaneous surrounding high quality image D in this case is an image reflecting a range of 180 degrees.

The cutting-out unit 44 cuts out desired areas $H_1$, $H_2$ and $H_3$ input from the desired area receiver 43 from the simultaneous surrounding high quality image the image synthesizer 49 creates.

Thus, as in the case of the surrounding high quality image, the decoder of the embodiment 3 enables the pseudo-scrolling and pseudo-zoom in/zoom out of the simultaneous surrounding high quality image.

Incidentally, although the foregoing example shows the configuration in which the decoders 4*a*, 4*b* and 4*c* each comprise the image synthesizer 49 that creates a single surrounding high quality image or a simultaneous surrounding high quality image by synthesizing a plurality of HD images, a configuration corresponding to the image synthesizer 49 can be set in the HD encoder 2.

Figure 11:
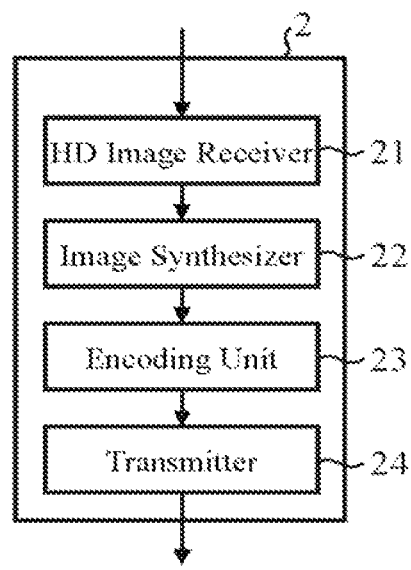
FIG. 11 is a diagram showing a configuration of an encoder of the embodiment 3 in accordance with the present invention.

The HD encoder 2 in this case has a configuration as shown in FIG. 11.

An HD image receiver (image receiver) 21 receives a plurality of HD images taken with the single HD camera 1*a* (or the plurality of HD cameras 1).

An image synthesizer 22 creates a single surrounding high quality image (or a single simultaneous surrounding high quality image) by synthesizing the plurality of HD images the HD image receiver 21 receives.

An encoding unit 23 encodes the single surrounding high quality image (or single simultaneous surrounding high quality image) the image synthesizer 22 creates.

A transmitter 24 transmits the single surrounding high quality image (or single simultaneous surrounding high quality image) the encoding unit 23 encodes to the network 3 as a distribution packet.

Figure 12:
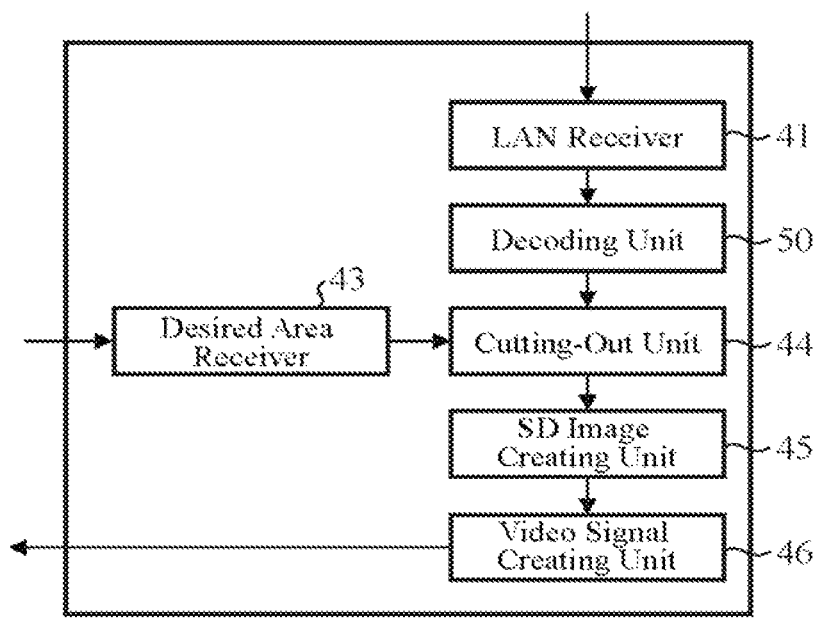
FIG. 12 is a diagram showing a configuration of a decoder of the embodiment 3 in accordance with the present invention.

As shown in FIG. 12, instead of the HD decoding unit 42 and image synthesizer 49 shown in FIG. 8(*b*), the decoders 4*a*, 4*b* and 4*c*, at which the distribution packet the transmitter 24 transmits arrives, comprises a decoding unit 50 that decodes the encoded data the LAN receiver 41 outputs, and restores the single surrounding high quality image (or single simultaneous surrounding high quality image). The cutting-out unit 44 cuts out the desired area from the single surrounding high quality image (or single simultaneous surrounding high quality image) the decoding unit 50 restores by decoding.

In addition, although the foregoing description is given on the assumption that the HD cameras 1 and 1*a* are a camera for taking an HD image, they can be a camera for taking a higher quality image than the HD image such as 4K, 8K or 16K (referred to as a "super-high quality image" from now on). The decoders 4a, 4b and 4c in this case comprise a decoding unit that restores a super-high quality image by decoding the encoded data the LAN receiver 41 outputs. The cutting-out unit 44 cuts out a desired area from the super-high quality image the decoding unit restores by decoding.

In this way, it can cut out a higher quality image than an HD image.

In addition, as in the embodiment 2, the decoder in the embodiment 3 can comprise the balance deciding unit 47 and voice mixer 48 to enable the pan-tilt scrolling of the SD image including the sound source.

As described above, according to the present embodiment 3, besides the advantages shown in the embodiment 1, it offers an advantage of being able to enable each monitoring station to carry out the pseudo-pan-tilt zoom independently from each other in an image that reflects a wider range.

Embodiment 4

An embodiment 4 in accordance with the present invention will now be described with reference to FIG. 13-FIG. 15.

The embodiment 3 shows an example that creates a single surrounding high quality image (or simultaneous surrounding high quality image) reflecting a wide area from a plurality of HD images. The embodiment 4 will be described using an example in which a camera with a fisheye lens takes an HD-quality image extending over 360 degrees.

Figure 13:
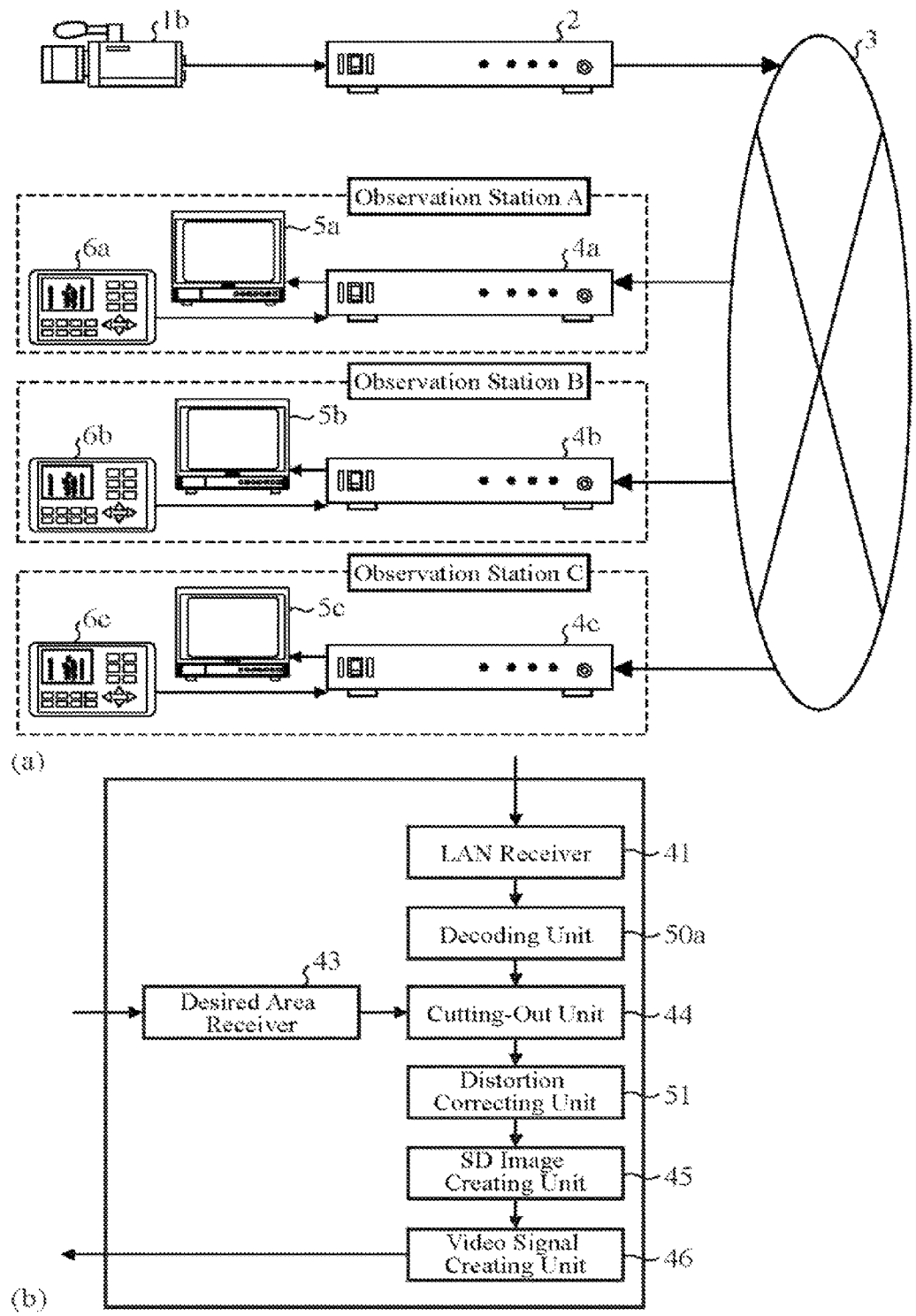
FIG. 13 is a diagram showing a decoder and a system with the decoder of an embodiment 4 in accordance with the present invention.

FIG. 13 is a diagram showing a decoder and a system with the decoder of the embodiment 4. FIG. 13(a) shows the whole system; and FIG. 13(b) shows a configuration of the decoders in the system. Incidentally, in the drawings, the same reference symbols designate the same or corresponding components. In addition, as for the components that have already been described in the embodiment 1, their description will be omitted suitably.

In FIG. 13(a), a camera 1b that has a fisheye lens and takes an HD-quality image extending over 360 degrees is placed instead of the HD camera 1 shown in FIG. 1(a).

FIG. 13(b) shows, as an internal configuration of the decoders 4a, 4b and 4c, the LAN receiver 41, the desired area receiver 43, the cutting-out unit 44, the SD image creating unit 45, the video signal creating unit 46, a decoding unit 50a, and a distortion correcting unit 51.

As for the functions of the LAN receiver 41, desired area receiver 43, and video signal creating unit 46, they are the same as those having been described already in the embodiment 1.

The decoding unit 50a decodes the encoded data the LAN receiver 41 outputs, and restores the HD-quality image extending over 360 degrees.

The cutting-out unit 44 cuts out the desired area input from the desired area receiver 43 from the HD-quality image extending over 360 degrees the decoding unit 50a restores.

The distortion correcting unit 51 corrects the distortion of the desired area cut out by the cutting-out unit 44 using a widely known image processing technique.

The SD image creating unit 45 reduces or enlarges the desired area passing through the distortion correction by the distortion correcting unit 51 in such a manner as to fit to the SD size image.

Figure 14:
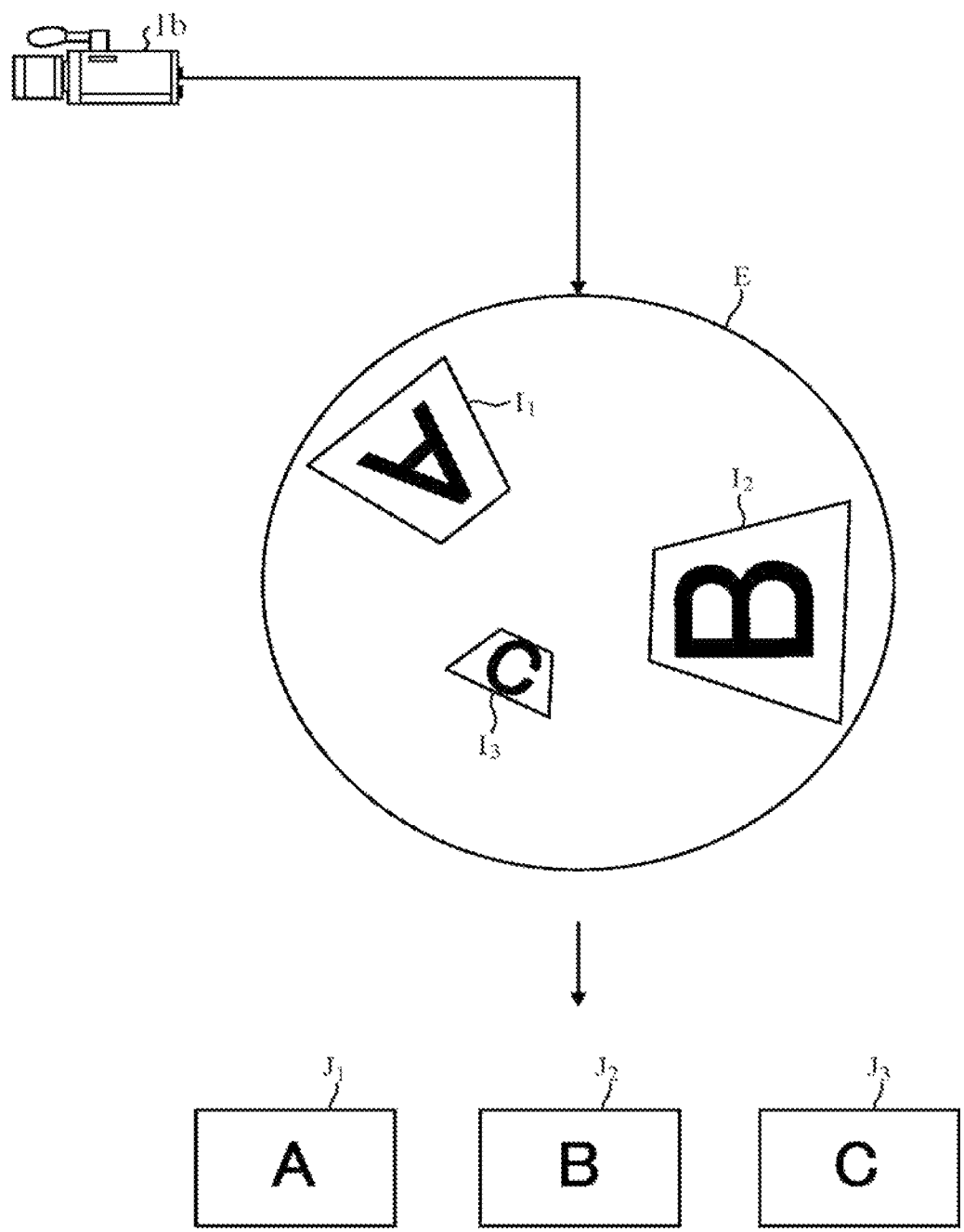
FIG. 14 is a diagram showing a process of the system of the embodiment 4 in accordance with the present invention.

FIG. 14 shows a process at the time when cutting out areas from the HD-quality image extending over 360 degrees taken with the camera 1b with a fisheye lens.

An HD-quality image E of 360 degrees the camera 1b takes is received by the LAN receiver 41 as a distribution packet, and is then decoded to the HD-quality image E of 360 degrees by the decoding unit 50a.

The cutting-out unit 44 successively cuts out the desired areas $I_1$, $I_2$ and $I_3$ input from the desired area receiver 43 from the HD-quality image E of 360 degrees the decoding unit 50a restores.

The distortion correcting unit 51 corrects the distortion of the images of the desired areas $I_1$, $I_2$ and $I_3$ cut out by the cutting-out unit 44.

The SD image creating unit 45 reduces or enlarges the images in the desired areas $I_1$, $I_2$ and $I_3$ passing through the distortion correction by the distortion correcting unit 51 in such a manner as to fit to the SD size image, thereby forming SD images $J_1$, $J_2$ and $J_3$.

In this way, according to the decoder of the embodiment 4, it can carry out pseudo-scrolling and pseudo-zoom in/zoom out for the HD-quality image extending over 360 degrees taken with the fisheye lens.

Incidentally, a configuration is also possible in which the distortion correcting unit 51 corrects the distortion of the entire HD-quality image extending over 360 degrees the decoding unit 50a restores, and the cutting-out unit 44 cuts out the desired areas from the HD-quality image extending over 360 degrees passing through the distortion correction.

In addition, a configuration is also possible in which the HD encoder 2 comprises a component corresponding to the distortion correcting unit 51, encodes the ND-quality image extending over 360 degrees which passes through the distortion correction, and distributes it to the decoders 4a, 4b and 4c.

Figure 15:
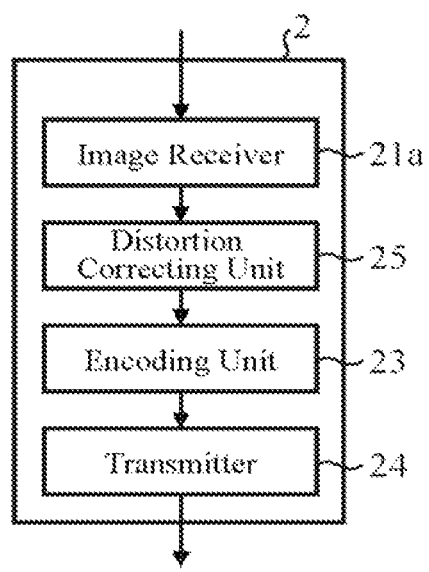
FIG. 15 is a diagram showing a configuration of an encoder of the embodiment 4 in accordance with the present invention.

The HD encoder 2 in this case has a configuration as shown in FIG. 15.

An image receiver 21a receives the HD-quality image extending over 360 degrees the camera 1b with a fisheye lens takes.

A distortion correcting unit 25 corrects the distortion of the HD-quality image extending over 360 degrees the image receiver 21 receives.

The encoding unit 23 encodes the HD-quality image extending over 360 degrees passing through the distortion correction of the distortion correcting unit 25.

The transmitter 24 transmits the HD-quality image extending over 360 degrees encoded by the encoding unit 23 to the network 3 as a distribution packet.

The decoders 4a, 4b and 4c, at which the distribution packet the transmitter 24 transmits arrives, have a configuration without the distortion correcting unit 51 shown in FIG. 13(b).

In addition, as for the camera with a fisheye lens 1b, it can be a camera that takes instead of an HD-quality image a super-high quality image extending over 360 degrees such as 4K, 8K, 16K or the like.

In addition, as for the decoders of the embodiment 4, they can comprise the balance deciding unit 47 and the voice mixer 48 as in the embodiment 2 to carry out the pan-tilt scrolling of an SD image including a sound source.

As described above, according to the present embodiment 4, besides the advantages of the embodiment 1, it offers an advantage of being able to carry out pseudo-pan-tilt zoom in an image extending wider in each monitoring station independently from each other.

Embodiment 5

An embodiment 5 in accordance with the present invention will now described with reference to FIG. 16-FIG. 19.

The embodiments 1-4 show an example in which the decoders 4a, 4b and 4c each comprise the cutting-out unit 44 so that the monitoring station side cuts out a desired area. The embodiment 5 will be described on the assumption that the HD encoder 2 comprises a unit corresponding to the cutting-out unit 44 so that the HD encoder 2 cuts out a desired area and distributes an image of the desired area.

Figure 16:
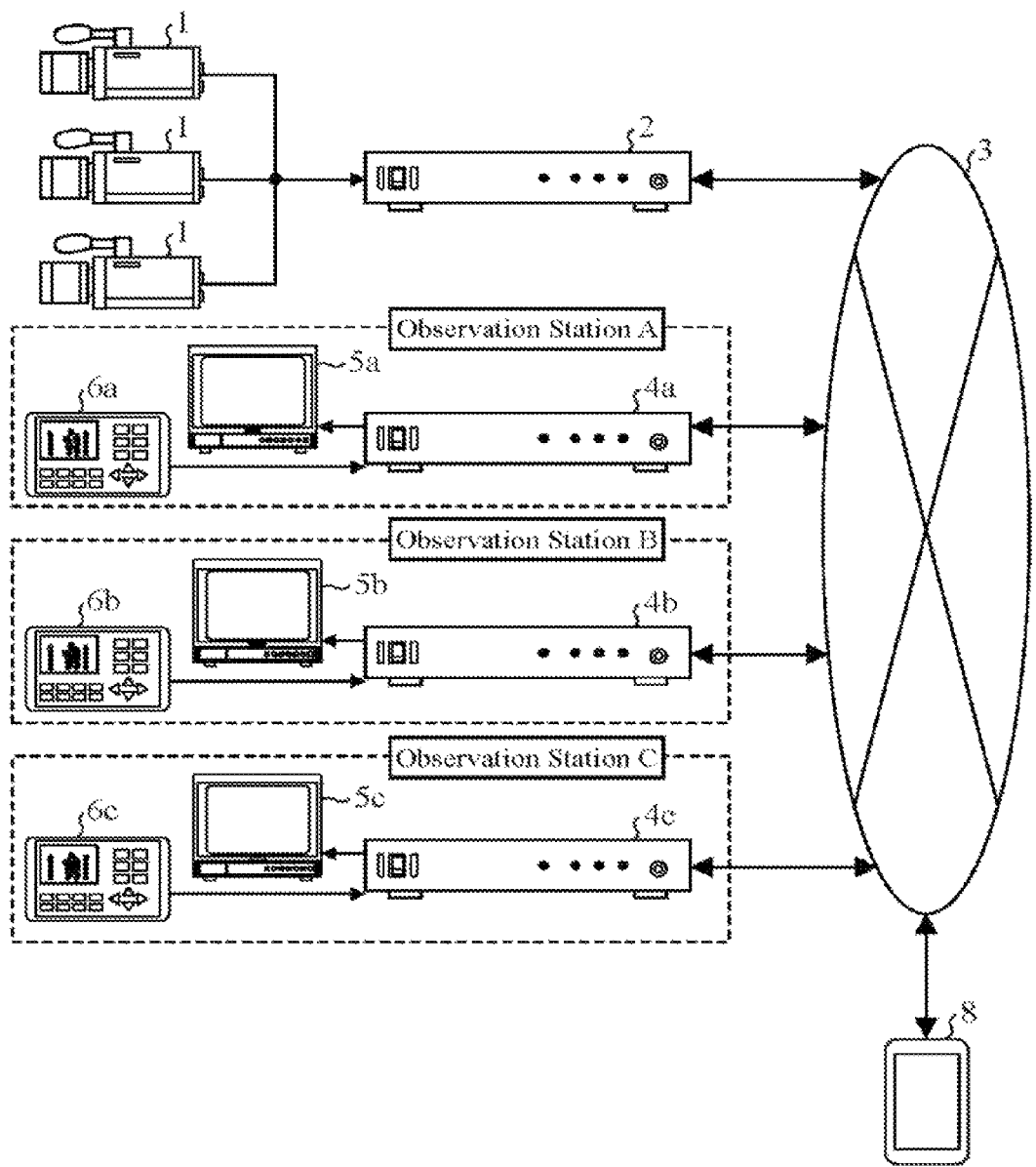
FIG. 16 is a diagram showing a system with a decoder of an embodiment 5 in accordance with the present invention.
Figure 17:
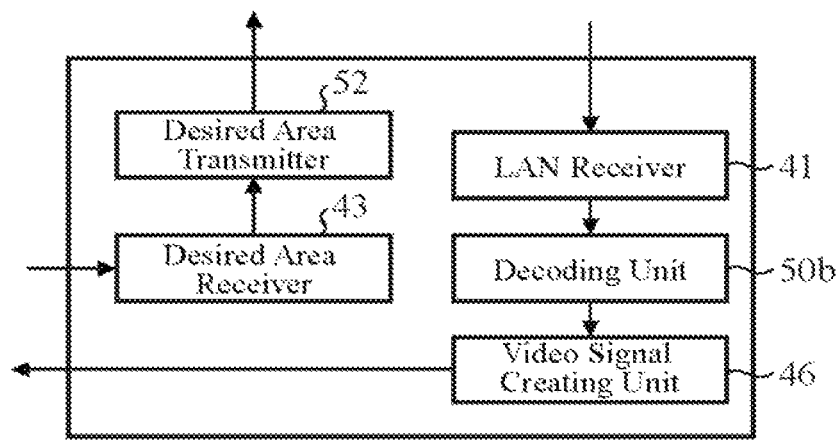
FIG. 17 is a diagram showing a configuration of a decoder of the embodiment 5 in accordance with the present invention.
Figure 18:
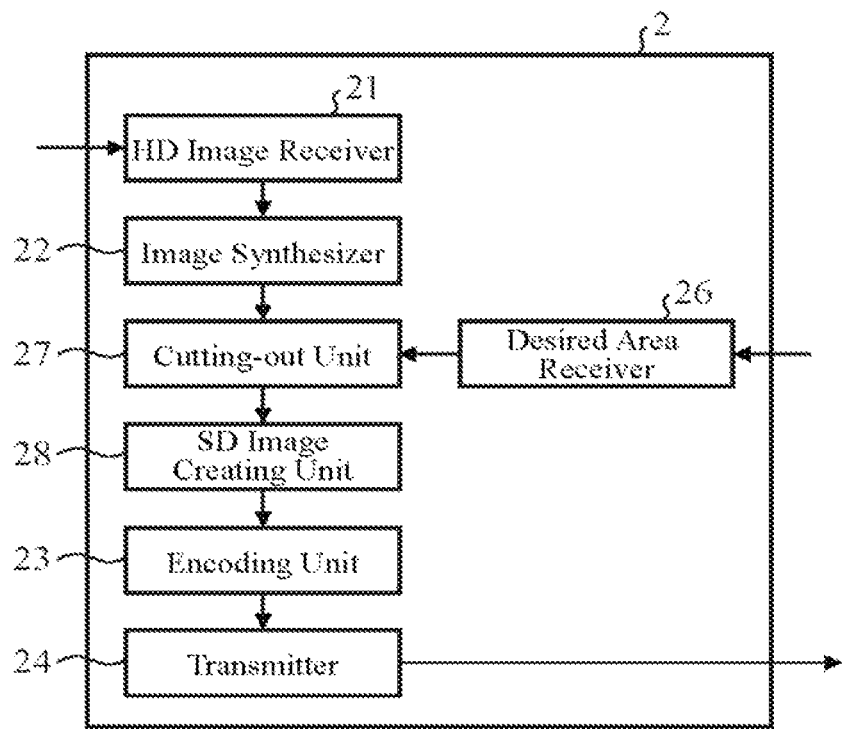
FIG. 18 is a diagram showing a configuration of an encoder of the embodiment 5 in accordance with the present invention.

FIG. 16 is a diagram showing a whole system with a decoder of the embodiment 5. In addition, FIG. 17 shows a configuration of the decoders in the system, and FIG. 18 shows a configuration of the HD encoder in the system. Incidentally, in each drawing, the same reference symbols designate the same or corresponding components. In addition, the description of the components given in the embodiments 1-4 will be omitted properly.

In FIG. 16, a plurality of fixed HD cameras 1 are installed.

As shown in FIG. 17, the decoders 4a, 4b and 4c each comprise the LAN receiver 41, the desired area receiver 43, the video signal creating unit 46, a decoding unit 50b, and a desired area transmitter 52.

As for the functions of the LAN receiver 41, desired area receiver 43, and video signal creating unit 46, they are the same as those described before in the embodiment 1.

The decoding unit 50b decodes the encoded data supplied from the LAN receiver 41 to restores an SD image.

The desired area transmitter 52 transmits the desired area the desired area receiver 43 receives to the HD encoder 2 via the network 3.

The HD encoder 2 comprises as shown in FIG. 18 the HD image receiver 21, the image synthesizer 22, the encoding unit 23, the transmitter 24, a desired area receiver 26, a cutting-out unit 27, and an SD image creating unit 28.

As for the ND image receiver 21, image synthesizer 22, encoding unit 23, and transmitter 24, they are the same as those described before in the embodiment 3.

The desired area receiver 26 receives and sets a desired area the desired area transmitter 52 transmits.

The cutting-out unit 27 cuts out the desired area input from the desired area receiver 26 from a single simultaneous surrounding high quality image the image synthesizer 22 creates.

The SD image creating unit 28 reduces or enlarges the desired area cut out by the cutting-out unit 27 in such a manner as to fit to the SD size image.

Next, the operation of the embodiment 5 in accordance with the present invention with the foregoing configuration will be described using the flowchart shown in FIG. 19.

The HD image receiver 21 receives a plurality of HD images the plurality of HD cameras 1 take (step ST10).

The image synthesizer 22 creates a single simultaneous surrounding high quality image by synthesizing the plurality of HD images the HD image receiver 21 receives (step ST11).

Figure 19:
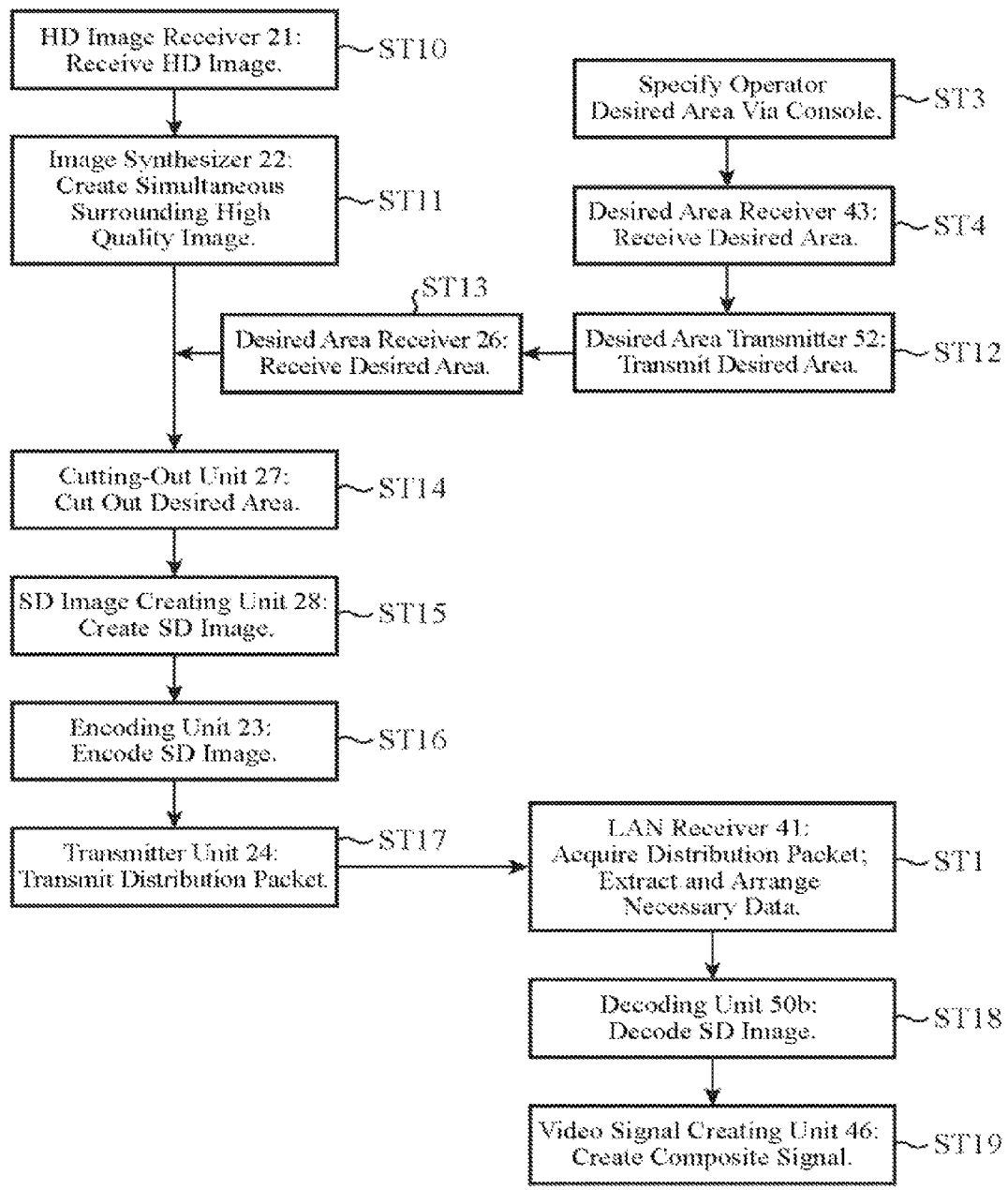
FIG. 19 is a flowchart showing a processing flow of the system of the embodiment 5 in accordance with the present invention.

At steps ST3 and ST4 shown in FIG. 19, the same processing as the processing at steps ST3 and ST4 shown in FIG. 5 is executed.

The desired area transmitter 52 transmits the desired area the desired area receiver 43 receives to the HD encoder 2 via the network 3 (step ST12).

The desired area receiver 26 receives and sets the desired area the desired area transmitter 52 transmits (step ST13).

The cutting-out unit 27 cuts out the desired area input from the desired area receiver 26 from the single simultaneous surrounding high quality image the image synthesizer 22 creates (step ST14).

The SD image creating unit 28 reduces or enlarges the desired area cut out by the cutting-out unit 27 in such a manner as to fit to the SD size image (step ST15).

The encoding unit 23 encodes the SD image it receives from the SD image creating unit 28 (step ST16).

The transmitter 24 transmits the SD image the encoding unit 23 encodes to the network 3 as a distribution packet (step ST17).

At step ST1 shown in FIG. 19, the same processing as the processing at step ST1 shown in FIG. 5 is executed.

The decoding unit 50b restores the original SD image by decoding the encoded data the LAN receiver 41 (step ST18).

The video signal creating unit 46 converts the SD image the decoding unit 50b decodes to a signal with a format the SD resolution monitor can display (step ST19).

In this way, the HD encoder 2 encodes the SD image and transmits it to the network 3 as a distribution packet. Accordingly, the present embodiment 5 can save the band of the network 3 as compared with the case where it encodes the HD image and transmits it as a distribution packet.

Incidentally, a configuration is also possible which comprises instead of the plurality of fixed HD cameras 1 a single swivel HD camera 1a that takes a picture while turning. In this case, the image synthesizer 22 creates a surrounding high quality image, and the cutting-out unit 27 cuts out the desired areas input from the desired area receiver 26 from the surrounding high quality image the image synthesizer 22 creates.

In addition, a configuration is also possible which comprises the camera 1b that has a fisheye lens and takes an HD-quality image extending over 360 degrees. In this case, the HD encoder 2 comprises instead of the image synthesizer 22 a distortion correcting unit that corrects the distortion of an image. Alternatively, instead of the HD encoder 2, the decoders 4a, 4b and 4c can comprise a distortion correcting unit. In addition, a configuration is also possible which comprises only one fixed HD camera 1. In this case, the HD encoder 2 is constructed without the image synthesizer 22.

In addition, a configuration is also possible in which the decoders 4a, 4b and 4c do not have the desired area receiver 43 nor the desired area transmitter 52, and the console 6a, 6b or 6c transmits the desired area directly to the HD encoder 2 via the network 3.

In addition, a configuration is also possible in which communication equipment 8 such as a tablet PC or smartphone connected to the network 3 receives a distribution packet transmitted from the HD encoder 2, and decodes the SD image. At this time, the communication equipment 8 is comprised of the individual components of the decoder shown in FIG. 17.

Then, if the communication equipment 8 is compatible with the image display with a resolution lower than an SD image, it can further save the band of the network 3 by configuring the system in such a manner that the HD encoder 2 encodes and transmits an image with the resolution lower than the SD image.

As described above, according to the present embodiment 5, besides the advantages shown in the embodiment 1, it offers an advantage of being able to save the band of the network 3.

Incidentally, it is to be understood that a free combination of the individual embodiments, variations of any components of the individual embodiments or removal of any components of the individual embodiments is possible within the scope of the present invention.

INDUSTRIAL APPLICABILITY

As described above, since a decoder and a monitor system in accordance with the present invention enable each monitoring station to observe any desired area in an image without being affected by the other monitoring stations, they are suitable for an application to a monitor system that carries out monitoring operations by sharing a camera provided for a monitor target among a plurality of monitoring stations.

DESCRIPTION OF REFERENCE SYMBOLS 1, 1a ND camera; 1b camera; 2 HD encoder; 21 HD image receiver; 21a image receiver; 22 image synthesizer; 23 encoding unit; 24 transmitter; 25 distortion correcting unit; 26 desired area receiver; 27 cutting-out unit; 28 SD image creating unit; 3 network; 4a-4c decoder; 41 LAN receiver; 42 HD decoding unit; 43 desired area receiver; 44 cutting-out unit; 45 SD image creating unit; 46 video signal creating unit; 47 balance deciding unit; 48 voice mixer; 49 image synthesizer; 50, 50a, 50b decoding unit; 51 distortion correcting unit; 52 desired area transmitter; 5a-5c SD resolution monitor; 6a-6c console; 7 stereo speakers; 8 communication equipment.

What is claimed is:

1. A decoder comprising:
   a data receiver that receives image data and stereo voice data accompanied with said image data;
   a decoder that decodes the image data and the stereo voice data to generate an original image and original stereo voice;
   a desired area receiver that receives information indicating a desired area on the original image;
   a cutter that generates a cut out area by cutting out the desired area from the original image;
   a balance decider that calculates a location within the original image, the location corresponding to a center of the cutout area, and that calculates at least two distances from the center of the cutout area to different edges of the original image;
   a voice mixer that adjusts, by using the at least two distances calculated by the balance decider, a volume of an entirety of the original stereo voice by shifting an entirety of said original stereo voice to the center of the cut out area; and
   an image former that reduces or enlarges the cut out area to a prescribed image size.

2. The decoder according to claim 1, further comprising:
   an image synthesizer that forms a combined image by combining a plurality of images obtained from the decoder, wherein
   the cutter cuts out the desired area from the combined image formed by the image synthesizer.

3. The decoder according to claim 1, further comprising:
   a distortion corrector that corrects distortion of the cutout area, wherein
   the image former reduces or enlarges the cutout area and passes through the distortion correction by the distortion corrector to the prescribed image size.

4. The decoder according to claim 1, further comprising:
   a distortion corrector that corrects distortion of the original image obtained from the decoder, wherein
   the cutter cuts out the desired area from the original image after distortion correction by the distortion corrector.

5. A monitor system comprising:
   an encoder that encodes an original image taken by a camera and an original stereo voice accompanied with said original image and outputs encoded data as image data and stereo voice data; and
   a decoder that comprises:
      a data receiver that receives the image data and the stereo voice data output by the encoder;
      a decoder that decodes the image data and the stereo voice data to generate an original image and original stereo voice;
      a desired area receiver that receives information indicating a desired area on the original image;
      a cutter that generates a cutout area by cutting out the desired area from the original image;
      a balance decider that calculates a location within the original image, the location corresponding to a center of the cutout area, and that calculates at least two distances from the center of the cutout area to different edges of the original image;
      a voice mixer that adjusts, by using the at least two distances calculated by the balance decider, volume of an entirety of the original stereo voice by shifting an entirety of said original stereo voice to the center of the cutout area; and
      an image former that reduces or enlarges the cutout area to a prescribed image size.

6. The monitor system according to claim 5, wherein the encoder encodes a combination of a plurality of images the camera takes and outputs encoded data as the image data.

7. The monitor system according to claim 5, wherein the encoder encodes an original image which is taken with a camera with a fisheye lens and which passes through distortion correction, and outputs encoded data as the image data.

* * * * *